(12) United States Patent
de Pablo Fouce et al.

(10) Patent No.: US 8,200,459 B2
(45) Date of Patent: Jun. 12, 2012

(54) METHODS AND SYSTEMS FOR GENERATING SUITABLE MESHES FOR HYBRID RANS/LES MODELLING

(75) Inventors: Valentín de Pablo Fouce, Madrid (ES); Juan Manuel Canalejo Bautista, Madrid (ES)

(73) Assignee: Airbus Espana, S. L., Madrid (ES)

( * ) Notice: Subject to any disclaimer, the term of this patent is extended or adjusted under 35 U.S.C. 154(b) by 260 days.

(21) Appl. No.: 12/191,395

(22) Filed: Aug. 14, 2008

(65) Prior Publication Data

US 2009/0312990 A1 Dec. 17, 2009

(30) Foreign Application Priority Data

Jun. 13, 2008 (ES) .................................. 200801787

(51) Int. Cl.
*G06F 17/10* (2006.01)
(52) U.S. Cl. ..................................... 703/2; 703/7; 703/9
(58) Field of Classification Search .................. 703/1, 2, 703/7, 9
See application file for complete search history.

(56) References Cited

U.S. PATENT DOCUMENTS

| | | | | |
|---|---|---|---|---|
| 6,356,860 | B1 * | 3/2002 | Barnette | 703/2 |
| 2008/0015825 | A1 * | 1/2008 | Kalitzin et al. | 703/2 |
| 2008/0177511 | A1 * | 7/2008 | Kamatsuchi | 703/1 |

OTHER PUBLICATIONS

Chung et al, "Navier-Stokes Analysis of the Flowfield Characteristics of an Ice Contaminated Aircraft Wing", Jan. 1999, American Institute of Aeronautics and Astronautics, AIAA-99-0375, pp. 1-23.*

M. Strelets, "Detached Eddy Simulation of Massively Separated Flows", Jan. 2001, American Institute of Aeronautics and Astronautics, AIAA 2001-0879, pp. 1-20.*

Temmerman et al, A Hybrid Two-Layer URANS-LES Approach for Large-Eddy Simulation at High-Reynolds Numbers, International Journal of Heat and Fluid Flow, vol. 26, No. 2, Apr. 2005, pp. 173-190.*

Hanjalic et al, Some Developments in Turbulence Modeling for Wind and Environmental Engineering, Journal of Wind Engineering and Industrial Aerodynamics, vol. 96, No. 10-11, Oct.-Nov. 2008, pp. 1537-1570.*

Tessicini et al, Large-Eddy Simulation of Three-Dimensional Flow Around a Hill-Shaped Obstruction with a Zonal Near-Wall Approximation, International Journal of Heat and Fluid Flow, vol. 28, No. 5, Oct. 2007, pp. 894-908.*

(Continued)

*Primary Examiner* — Russell Frejd
(74) *Attorney, Agent, or Firm* — Ladas & Parry LLP

(57) ABSTRACT

A method of generating a mesh of an object (11) that moves through a fluid medium which is used in the design or analysis of the object (11) in connection with a hybrid method combining RANS and LES comprising the following steps: a) creating an inner "C" topology (21) around the object (11) for a boundary layer description; b) creating an outer "C" topology (23) covering a space region including the separation region; c) locating the separation region and adapting to it the inner and outer "C's" topologies (21, 23) so that the outer "C" topology (23) is adapted to the size of the separated region and the inner "C" topology (21) is adapted to the size of the boundary layer; d) refining the mesh in the separation region according to the specifications of the RANS/LES method. The invention also provides a system for carrying out the method.

8 Claims, 2 Drawing Sheets

OTHER PUBLICATIONS

Edwards et al, Numerical Simulations of Shock/Boundary Layer Interactions Using Time-Dependent Techniques: A Survey of Recent Results, Progress in Aerospace Sciences, vol. 44, No. 6, Aug. 2008, pp. 447-465.*

Viswanathan et al, Detached Eddy Simulation of Turbulent Flow and Heat Transfer in a Two-Pass Internal Cooling Duct, International Journal of Heat and Fluid Flow, vol. 27, No. 1, Feb. 2006, pp. 1-20.*

* cited by examiner

METHODS AND SYSTEMS FOR GENERATING SUITABLE MESHES FOR HYBRID RANS/LES MODELLING

FIELD OF THE INVENTION

The present invention refers to methods and systems for generating suitable meshes for hybrid RANS/LES modeling, particularly in the aeronautical field.

BACKGROUND OF THE INVENTION

Nowadays use of Computational Fluid Dynamics (CFD) is extended in the aeronautical industry. In order to reduce investment in Wind Tunnel Tests simulation is increasingly used in design activities.

CFD discretizes the physical domain into small cells where the Navier-Stokes equations or simplifications of them, for example the Reynolds Averaged Navier-Stokes, are computed. That implies that in order to perform a good computation one needs a good mesh. Mesh quality is usually defined by cell deformation or the growing ratio between cells. Also residuals computed in the equations give a good idea of the quality of the computation.

Hybrid turbulence modeling simulations that use a combination of Reynolds-averaged Navier-Stokes (RANS) equations and large-eddy simulation (LES) are becoming increasingly popular to increase predictive accuracy in complex flow situations (specially in detached flows) without the cost of full large-eddy simulations. Hybrid methods that use RANS and LES need to adapt the mesh for the use of both methodologies in the same computations, so that a mesh with a RANS zone relatively coarse (compared with LES zone) is needed and a zone of high resolution without propagation to the RANS zone is also a need for the LES zone. As LES demands to be non-stationary RANS is used in non-stationary mode (Unstationary RANS or URANS). LES is a turbulence modeling method with a subgrid scale model, that means that mesh resolution can have some influence on the final solution. There is no mesh convergence, there is a solution convergence as the more refinement generated the more scales are resolved. That implies that a good quality in a LES zone is defined by the mesh resolution.

The meshes mainly used in CFD are of three types: entirely structured, totally unstructured or hybrid, that is a mixture of these two mesh types.

Structured meshes are meshes whose connectivity is regular and fixed by the topology: each inner vertex is topologically connected to his neighbors inside the block. Also the number of cells are propagated inside the block and to the neighbor blocks. All nodes inside a structured mesh can be located using indexes (l,j,k), so that connectivity is explicit.

Unstructured meshes have a completely arbitrary connectivity: a vertex of the mesh can belong to non obvious cells. The topological data therefore have to be permanently stored to explicitly know the neighbors of each node. The memory cost involved by the use of an unstructured mesh can therefore become very rapidly penalizing.

For complex geometries structured meshes are divided in several blocks, creating multiblock-structured-meshes in which the actual geometry is formed by several structured blocks, having structurally ordered meshes inside them.

The location and distribution of blocks in the physical domain, i.e. the mesh topology, play a significant role for achieving a good description of the geometry. The connection between blocks is also important due to the node propagation, as block faces propagate the numbers of nodes between two blocks in contact.

On the other hand, equations can define a special physics called Boundary Layer (BL) behavior, this BL not only appears in CFD equations, also other equations can create this BL behavior and will have similar treatment. This BL behavior forces mesh topologies to create a "C" topology around the surfaces. "C" topology is defined as a topology that surrounds the airfoils (and the objects inside the flow) so that mesh refinement is not propagated upstream the airfoil and only located downstream. FIG. 1 shows an example of a "C" topology around an 2D airfoil. In hybrid methods (RANS/LES) the boundary layer zone must be described using RANS.

Several constrains are usually applied to mesh topology definitions, such as the following:

The need that the topology must mark the limits of the surfaces.

The need that the topology must take into account the geometrical discontinuities of the surfaces.

The need to use a "C" topology around the surfaces caused by a Boundary Layer (BL) behavior.

A typical mesh quality requirement is that the cells are as close as possible to perfect cubes (3D) or squares (2D). In order to check that quality requirement there are several mathematical formulas, for example, assuring that no one of the planar angles is below 20-30°, also another criteria could be the angle formed by whatever diagonals of the cubes (or the squares) not lower to 20-30° too, or the determinant of the transformation is up to 0.2. For LES computations also one must assure that the refinement is good enough for have a good description of eddies.

All structured meshes have their blocks topologically connected at the interfaces, that means that interfaces must have exactly the same number of nodes (continuity). There is a possibility of creating TNC (total-non-coincident) nodes interfaces where a jump in the number of cells and distribution can be found. Their use can create problems in interpolations, however reduces the number of nodes. A good strategy is to use TNCs at low gradient zones, this zones are usually called "euler" zones as they are zone far from the wall boundaries and their flux is close to an euler flux. Generally is recommended to avoid TNC inside boundary layers.

Although hybrid methods have not been widely use in industry, some applications for airfoils have been disclosed.

The use of a traditional "C" topology is disclosed in "Detached-Eddy Simulation of Three Airfoils with Different Stall Onset Mechanisms". Dong Li, Igor Men'shov and Yoshiaki Nakamura. Journal of Aircraft Vol 43 No. 4. July-August 2006.

The use of an "O" topology is disclosed in "Detached-Eddy Simulation for Iced Airfoils". Jianping Pan and Eric Loth. Journal of Aircraft Vol 42 No. 6 November-December 2005.

The use of new topologies is disclosed in "Detached Eddy Simulations of an Iced-Airfoil". S. Kumar and E. Loth. 39th AIAA Aerospace Sciences Meeting and Exhibit. 8-11 Jan. 2001. Reno.

The increasing use of hybrid method demands optimized CFD models and the present invention is intended to attend this demand.

SUMMARY OF THE INVENTION

It is an object of the present invention to provide methods and systems for generating optimized meshes for hybrid RANS/LES modeling using RANS inside the boundary layer and LES in the separated region allowing computational time savings.

It is another object of the present invention to provide methods and systems for generating meshes for hybrid RANS/LES modeling that allow keeping the control on a "C" topology at the boundary layer to assure a good description of the RANS boundary layer behavior mixed with a control on cell size along the LES separated region.

In one aspect, these and other objects are met by providing a method of generating a mesh of an object that moves through a fluid medium which is used in the design or analysis of said object in connection with a hybrid method combining RANS and LES, comprising the following steps:

a) Creating an inner "C" topology around said object for a boundary layer description.

b) Creating an outer "C" topology around the inner "C" topology covering a space region including the separation region.

c) Locating the separation region and adapting to it said inner and outer "C's" topologies so that the outer "C" topology is adapted to the size of the separated region and the inner "C" topology is adapted to the size of the boundary layer.

d) Refining the mesh in the separation region according to the specifications of said RANS/LES method.

In another aspect, the above-mentioned objects are met by providing a system for generating a mesh of an object that moves through a fluid medium which is used in the design or analysis of said object in connection with a hybrid method combining RANS and LES that comprises a computer-implemented CFD model that allows the generation of said mesh in the following steps:

a) Creating an inner "C" topology around said object for a boundary layer description.

b) Creating an outer "C" topology around the inner "C" topology covering a space region including the separation region.

c) Locating the separation region and adapting to it said inner and outer "C's" topologies so that the outer "C" is adapted to the size of the separated region and the inner "C" topology is adapted to the size of the boundary layer.

d) Refining the mesh in the separation region according to the specifications of said RANS/LES method.

Other characteristics and advantages of the present invention will be clear from the following detailed description of embodiments illustrative of its object in relation to the attached figures.

DETAILED DESCRIPTION OF THE INVENTION

Hybrid methods combining RANS and LES use a mixed CFD modeling. One of these methods, known as DES, is disclosed in "Comments on the Feasibility of LES for Wings and on the Hybrid RANS/LES Approach". Spalart, P. R., Jou, W.-H., Stretlets, M., and Allmaras, S. R. Advances in DNS/LES, Proceedings of the First AFOSR International Conference on DNS/LES. 1997.

In order to have a good description the recommendation is to use RANS inside the BL and LES in the separated region. Further recommendations can be found at "Young-Person's Guide to Detached-Eddy Simulation Grids" Spalart, P. R. NASA/CR-2001-211032.

All structured meshes have the problem of propagation, making local refinements to be propagated in all the fluid domain. Isolation of zones with needed refinement is a must in order to assure reduction of number of nodes in not high required zones and so computational time saving, giving a cost reduction in execution.

A mesh generated according to this invention assures that the BL is restricted and computed isolated and isolates the big separation zone in order to be refined independently reducing the total computational time needed for the computation.

In a preferred embodiment a method according to this invention to generate said mesh comprises the following steps:

a) Creating a "C" topology 21 around the object where an hybrid RANS/LES model will be used for simulation. In the preferred embodiment that we are describing said object is an airfoil 11 that creates a separated flow around it.

b) Creating an outer "C" topology 23 around the previous inner "C" topology 21. The exact situation of the outer "C" topology 23 will be defined in next steps.

The inner "C" 21 is used for a better boundary layer description. All boundary layer must be described inside this topology part. In a hybrid model the RANS computation of the Boundary Layer must be done inside this layer (zonal models can, for example, define specifically which zone have only RANS or hybrid models).

c) Locating the separation region and adapting the mesh to its size.

Hybrid models of RANS/LES have the idea of using URANS (non-stationary RANS) model inside the boundary layer (close to the wall boundaries) and LES models in the separation region, this region needs high definition in order to achieve a precise description of the eddies, on the other hand the regions far from the wall boundaries have a flux close to a euler kind flux so not high definition of the flow is needed.

Figure 1:
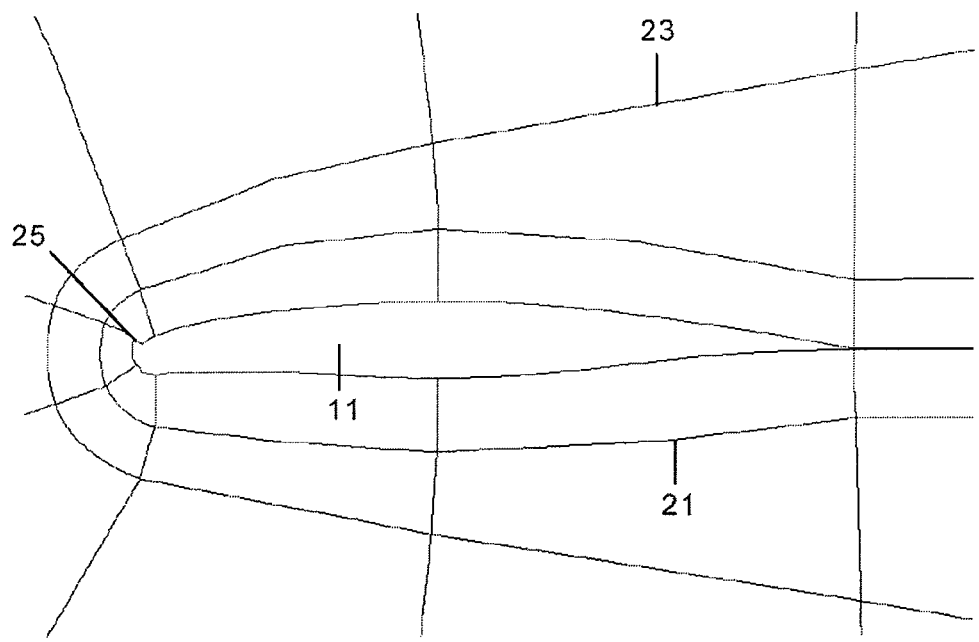
FIG. 1 shows a double "C" topology around an airfoil.

The separated region can be defined using several approaches:

Know-how of the user, for example with respect to FIG. 1, it can be said that the separation region begins after the ice shape 25.

A more advanced CFD computation or Wind Tunnel data.

Using separation criteria like, for example, Stratford's separation criteria.

Figure 2:
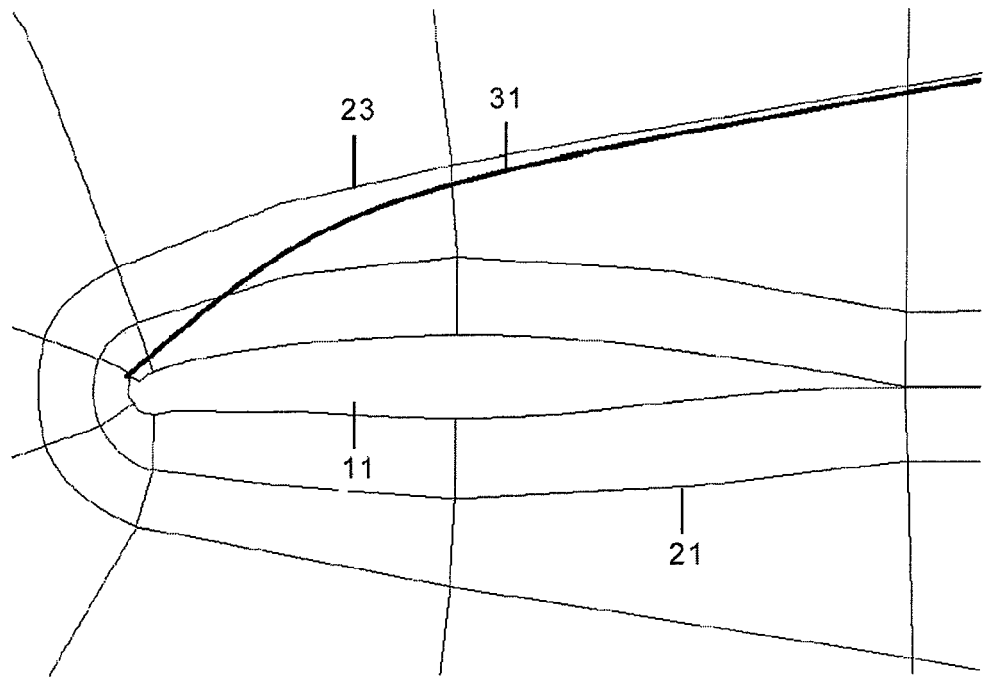
FIG. 2 shows a typical separated region streamline division.
Figure 3:
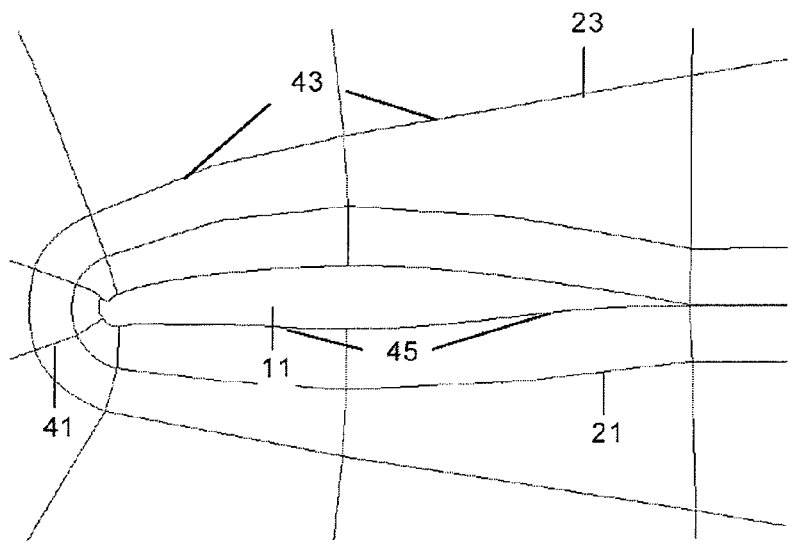
FIG. 3 shows cell jump locations close to the airfoil.
Figure 4:
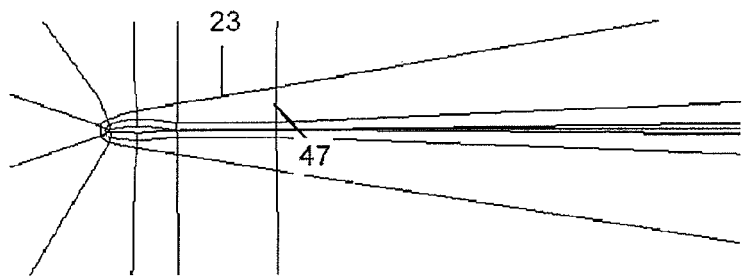
FIG. 4 shows cell jump locations at downwash.

The separation region is defined as the region where reverse flow is found due to adverse pressure gradient. All the space region with reverse flow must be included inside the outer "C" 23. In a CFD computation streamlines will divide the region of separated flow and attached flow. In the embodiment illustrated in the Figures the separation region is defined as the zone after the ice shape 25 and it is considered that the separation region is expected to be of half size of the airfoil 11 chord at the trailing edge, so that the outer "C" 23 is adapted to said consideration. If a CFD computation is used it must be assured that the outer "C" 23 contains the whole streamline 31 that divides the flow between separated and attached. As it can be seen in FIG. 2 the front part of the outer "C" 23, close to the leading edge of airfoil 11 can be reduced as the separated region is quite close to the airfoil surface.

d) Refining the mesh. Once the mesh is adapted to the separation region a mesh refinement is performed to adapt the mesh to the previous declared constrains: increased mesh refinement for LES and avoiding huge quantity of nodes around the domain.

This step includes the following sub-steps:

d1) Inside the separation region the block must be refined according to the hybrid RANS/LES model used and its specifications.

d2) Block interface cell jumps must be created In order to avoid high quantity of nodes propagated in the whole domain.

As it is well known structured meshes propagate the number of nodes at the interfaces of the faces (3D) or edges (2D). For high performance computations (that could need several days) is important to reduce the propagation of nodes from the high definition zones (separated zones) and low definition zones (euler zones). A common technique in this respect is to define faces (3D) or edges (2D) where there is a jump of the number of cells (TNC, total non-coincident cells). This technique applied to the mesh can reduce the number of cells and consequently the time needed for a computation. With the previous defined topology the advantage obtained is that the cell propagation is redirected around the airfoil and it can be assured that any cell jump is done in an euler region (where the flow can be said not affected by viscous effects). Using previous topologies high number of cells in "euler" regions will be found increasing the computational time. On the other hand the topology can be adapted to the size of the separated region in order to be able to direct the refinement in the required zone.

Suitable locations for said cell jumps are the following:

In the outer "C" 23 in a split 41 that transversally cuts the "C" zone located before the separation region.

At the external boundary 43 of the outer "C" 23.

At the airfoil side 45 opposite to the separation region.

At the downwash 47 when there is no upstream influence (far from the airfoil, depending on the precision needed of this region).

Solvers have a constrain that no huge jump of cells are allowed at the boundary of blocks, so that refinement and jump of cells are linked in only one step.

Figure 5:
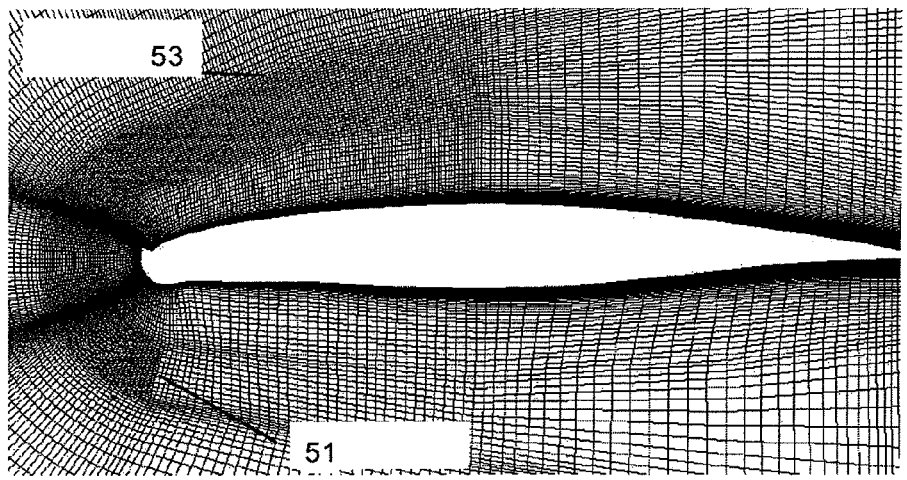
FIG. 5 shows a mesh generated according to the present invention.

FIG. 5 shows a mesh in which a cell jump 51 to reduce the propagated nodes on the lower region where the flow is no separated and a cell jump 53 at the external boundary of the outer "C" are highlighted.

A system for carrying out the above mentioned method can be implemented by means of a computer-implemented model DES using the commercial software package elsA.

The methods and systems according to this invention are particularly applicable to the design or analysis of airplanes or any of its parts, i.e. fuselages, wings, tails or combinations (fuselage+wing, fuselage+tails).

Modifications may be introduced into the preferred embodiment just set forth, which are comprised within the scope defined by the following claims.

The invention claimed is:

1. A method of generating a mesh of an object that moves through a fluid medium which is used in the design or analysis of said object in connection with a hybrid method combining RANS and LES, said hybrid method having a set of specifications, wherein said method of generating a mesh comprises the following steps:
   a) creating an inner "C" topology around said object for a boundary layer description;
   b) creating an outer "C" topology around the inner "C" topology covering a space region including a separation region;
   c) locating the separation region intermediate the inner and outer topologies and connecting it to said inner and outer "C's" topologies so that the outer "C" topology is fixed to the size of the separated region and the inner "C" topology is fixed to the size of the boundary layer;
   d) refining the mesh in the separation region according to the specifications of said RANS/LES hybrid method.

2. A method according to claim 1, wherein the step d) includes creating cell jumps in one or more of the following locations:
   a split cutting transversally the outer "C" topology before separation region;
   the external boundary of the outer "C" topology;
   the object side opposite to the separation region;
   the downwash without upstream influence.

3. A method according to claim 1, wherein said object is an airfoil and the flow is detached.

4. A method according to claim 3, wherein said object is an airplane or any of its parts.

5. A system for generating a mesh of an object that moves through a fluid medium which is used in the design or analysis of said object in connection with a hybrid method combining RANS and LES, said hybrid method having a set of specifications, wherein said method of generating a mesh comprises a computer-implemented CFD model that allows the generation of said mesh in the following steps:
   a) creating an inner "C" topology around said object for a boundary layer description;
   b) creating an outer "C" topology around the inner "C" topology covering a space region including a separation region;
   c) locating the separation region intermediate the inner and outer topologies and connecting it to said inner and outer "C's" topologies so that the outer "C" topology is fixed to the size of the separated region and the inner "C" topology is fixed to the size of the boundary layer;
   d) refining the mesh in the separation region according to the specifications of said BANS/LES hybrid method.

6. A system according to claim 5, wherein step d) includes creating cell jumps in one or more of the following locations:
   a split cutting transversally the outer "C" topology before the separation region;
   the external boundary of the outer "C" topology;
   the object side opposite to the separation region;
   the downwash without upstream influence.

7. A system according to claim 5, wherein said object is an airfoil and the flow is detached.

8. A system according to claim 7, wherein said object is an airplane or any of its parts.

* * * * *